United States Patent Office 3,454,537
Patented July 8, 1969

3,454,537
PROCESS FOR THE ANIONIC POLYMERIZATION OF LACTAMS TO POLYAMIDES
Shohei Tokiura, Hideo Ishida, and Yoshikazu Sasaki, Hirakata-shi, and Tatsuo Yamamoto, Kyoto, Japan, assignors to Ube Industries, Ltd., Yamaguchi, Japan
No Drawing. Filed Sept. 27, 1966, Ser. No. 582,219
Claims priority, application Japan, Mar. 17, 1966, 41/16,143
Int. Cl. C08g 20/18, 20/16, 20/12
U.S. Cl. 260—78                                    2 Claims

ABSTRACT OF THE DISCLOSURE

An improved method for the polymerization of substantially anhydrous lactams having from 3 to 12 carbon atoms in the ring which comprises utilizing an improved co-catalyst which is 2-(2'-chloro-2',3'-dehydrocyclohexamethyleneimino) - 2,3-dehydrocyclohexamethyleneimine, having the formula:

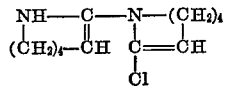

The polymerization generally occurs below the melting point of the resulting polyamide and a lactam-base salt is also used as a catalyst. Various reaction conditions are defined in the specification.

---

This invention relates to a process, and more particularly to an improved process for the polymerization of lactams to polyamides.

The polymerization of caprolactam to give 6-nylon, a polyamide, has been known for many years. The earliest processes for this polymerization involved the use of water or acidic reagents as polymerization catalysts, were slow, and required quite a long time. Subsequent work showed that anhydrous caprolactam could be polymerized above 200° C. in the presence of strongly basic materials, particularly the alkali and alkaline earth metals, their hydrides, hydroxides, alkoxides, oxides, and amines. More recently, it has been disclosed that the anionic polymerization of caprolactam and other lactams can be accomplished very rapidly by the addition of certain compounds which function as co-catalysts. Particularly effective co-catalysts which have been disclosed include acyl halides, anhydrides, and the like; isocyanates, triazine derivatives and compounds containing tertiary nitrogen having at least two of the three substituents on the nitrogen atom consisting of carbonyl, thiocarbonyl, sulfonyl, phosphinyl, thiophosphinyl and nitroso radicals.

The present invention provides an improved process for rapidly polymerizing lactams. More particularly, the process of this invention provides an improvement in the process for polymerizing lactams in the presence of well-known iminium salts. This improvement comprises carrying out the polymerization in the presence of a co-catalyst, 2-(2'-chloro-2',3' - dehydrocyclohexamethyleneimino)-2,3-dehydrocyclohexamethyleneimine having the following formula:

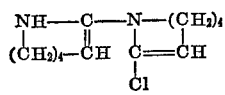

This compound is prepared by the method described in Journal of the Chemical Society of Japan, vol. 84, No. 8, 740–744 (1963); Fukumoto Tsugio and Murakami Masuo; Studies on synthesis of DL-lysine through-oxyimino-caprolactam, namely, condensing a reaction product of caprolactam and phosphorus pentachloride or phosphorus oxychloride with alkali metal hydroxide.

The polymerization process of this invention particularly effective in rapidly producing high molecular weight polyamines from lactams containing from 3 to 12 or more carbon atoms in the lactam ring. Such lactams include pyrrolidone, piperidone, caprolactam, enantholactam, caprylolactam, and laurolactam. Generally in the presence of a co-catalyst, the anionic polymerization process of lactam can be carried out at temperatures above the melting point of the lactam monomer but below the melting point of the resulting polyamide. In general, this temperature range is from about 25° C. to about 200° C., depending on the particular lactam employed. With lactams containing less than 6 carbon atoms in the lactam ring, the preferred temperature of polymerization is below 190° C. Caprolactam is readily polymerized by the process of this invention at temperatures between 100° C. and 200° C., with 160° C. being a convenient operating temperature. The well-known iminium salts used in the process of this invention are prepared by the reaction of bases with a lactam. Generally, the lactam to be polymerized is used for the preparation of the anionic catalyst; but if desired, the anionic catalyst can be prepared from another lactam.

The substances employed to form the anionic catalyst can be an alkali metal, an alkaline earth metal, aluminum, or a basic derivative of one of these metals, such as an hydroxide, alkoxide, hydride, aryl, amide, or organic acid salt. All of these substances are strong enough to convert the lactam to its iminium salt. Thus, sodium hydroxide, potassium hydroxide, lithium hydroxide, magnesium hydroxide, calcium hydroxide, strontium hydroxide, lithium hydroxide, sodium hydride, sodium methylate, sodium ethylate, sodium phenolate, sodium α- or β-naphtholate, sodamide, sodium stearate, lithium aluminium hydride, aluminium propylate, and the like are suitable substances for the preparation of the anionic catalyst. This anionic catalyst, that is, lactam-base salt, is prepared by heating the lactam with the aforesaid substances at temperature between about 25° C. and about 200° C. The said substances can be added to the total lactam which is to be polymerized or to a portion of it in order to prepare the anionic catalyst. The latter can be added to the remainder of the lactam later. Little or no polymerization occurs during the preparation of the anionic catalyst. The time required for the preparation of the anionic catalyst depends upon the properties of the substances employed, the quantity added, and the temperature chosen and generally can be from a few seconds to several hours. Preferably, the lactam should be essentially as anhydrous as the added substance. The ratio of the substance to be added usually is in the range between about 0.1 and about 10 mole percent based on the lactam, which is necessary to conduct the polymerization. The higher the ratio of the anionic catalyst to lactam, the lower is the molecular weight of the polyamides which can be obtained. Consequently, the optimum proportions for most purposes are from about 0.1 to about 5 mole percent.

The co-catalyst, 2-(2'-chloro-2', 3'-dehydrocyclohexamethyleneimino)-2,3 - dehydrocyclohexamethyleneimine, can be employed in proportions varying from about 0.1 to about 5 mole percent based on the lactam. At any time when polymerization is desired, the co-catalyst can be added to the lactam containing the anionic catalyst. Otherwise, the anionic catalyst and co-catalyst can be separately dissolved in two portions of the total lactam and subsequently mixed together. For optimum operation of the process of this invention, an inert gas such as, nitrogen, is introduced onto the surface of the molten lactam during the reaction to prevent oxydation.

The process of this invention is useful in rapidly preparing cast articles of any size and shape directly from lactams. The process can be employed to obtain unusual shapes which would be difficult, if not impossible, to obtain by the conventional molding method of polyamides. The process has advantage when used in the manufacture of large molded articles, because injection molding or similar processes require high temperatures and high pressures for their operations. Therefore, simpler and lighter weight molds can be employed and faster cycles can often be obtained in the manufature of large shaped articles. The entire process can be carried out in the mold or, if desired, the lactam solution containing the anionic catalyst and a second portion of the lactam solution containing the co-catalyst can be mixed and then immediately cast into the mold by procedures similar to those of transfer molding so as to obtain the desired, shaped article in any size and at a very high rate. Similarly, it is possible to employ the process of this invention in many extrusion-type operations, in which the lactam containing the anionic catalyst and other portion of the lactam containing the co-catalyst are intimately mixed and then extruded under conditions which provide for obtaining an extrudate which is formed immediately following the polymerization process.

The process of this invention is operable in the presence of various fillers and reinforcing agents. Thus, if desired, glass mats or mats of synthetic fibers can be impregnated and then polymerized. Similarly, finely-divided fillers can be suspended in the polymerizing mixture to obtain filled polyamides. Antioxidants, blowing agents, plasticizers, other resins (e.g., polystyrene, polyvinyl chloride, polyacetal, polyester), colorants, and the like can also be empolyed. The invention contemplates the use of the process under all of the above conditions.

The invention is more thoroughly illustrated with the aid of the following examples.

Relative viscosity described in the following examples was determined with Ostwald's viscosimeter with a solution of 1% of the polymer in 98% sulfuric acid and at 25° C.

Example 1

A mixture of 22.6 g. of dry caprolactam, and 0.54 g. of sodium salt of caprolactam was placed in a reaction vessel which was immersed in a silicon oil bath at 160° C. and nitrogen was introduced onto the molten caprolactam at the rate of 300–400 cc./minute. Then, 0.90 g. of 2-(2'-chloro-2', 3' - dehydrocyclohexamethyleneimino,)2,3-dehydrocyclohexamethyleneimine, as co-catalyst, was added to the molten caprolactam.

After the addition of the co-catalyst, a very viscous state was observed in about 10 minutes, a white cloudy substance indicating the crystallization was produced in about 20 minutes, and the shrinking of the polymer from the walls of the reaction vessel was observed in about 25 minutes. At that time, the polycaprolactam product was cooled to the room temperatures.

The conversion to polycaprolactam was found to be 91.8 percent by weight, and the relative viscosity of the polycaprolactam was 4.7.

Example 2

The procedure of Example 1 was repeated, but 0.09 g. of sodium metal and 0.45 g. of the co-catalyst were added.

The white polycaprolactam product was cooled to the room temperature after an elapse of 20 minutes following the addition of the co-catalyst.

The conversion to polycaprolactam was found to be 92.4 percent by weight, and the relative viscosity was impossible to determine as the polycaprolactam was insoluble in 98% sulfuric acid at 25° C.

Example 3

The procedure of Example 1 was repeated, but 0.27 g. of the sodium salt of caprolactam and 0.45 g. of the co-catalyst was added.

The white polycaprolactam product was cooled to room temperature after an elapse of 30 minutes following the addition of the co-catalyst.

The conversion to polycaprolactam was found to be 92.8 percent by weight, and the relative viscosity of the polycaprolactam was 6.7.

Example 4

The procedure of Example 1 was repeated, but 0.045 g. of sodium metal and 0.45 g. of said co-catalyst were added, and the polymerization temperature was held at 180° C.

After the addition of the co-catalyst, a very viscous state was observed in about 6 minutes, and the shrinking of the polymer from the walls of the reaction vessel was observed in about 20 minutes. At that time, the polycaprolactam product was cooled to room temperature.

The conversion to polycaprolactam was found to be 92.0 percent by weight, and the relative viscosity of the polycaprolactam was 6.3.

I claim:

1. In a process for the polymerization of substantially anhydrous lactams having from 3 to 12 carbon atoms in the ring which comprises heating said lactam to a temperature below the melting point of the resulting polyamide in the presence of from about 0.1 to about 10 mole percent of a lactam-base salt, based on the amount of lactam, and a co-catalyst, the improvement which comprises using as said co-catalyst from about 0.1 to about 5 mole percent, based on the amount of lactam, of 2-(2'-chloro-2', 3' -dehydrocyclohexamethyleneimino)-2, 3-dehydrocyclohexamethyleneimine having the following formula:

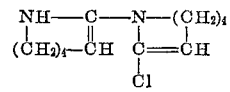

2. In a process for the polymerization of substantially anhydrous caprolactam which comprises heating said caprolactam to a temperature below the melting point of the resulting polyamide in the presence of from about 0.1 to about 10 mole percent of a lactam-base salt, based on the amount of caprolactam, and a co-catalyst, the improvement which comprises using as said co-catalyst from about 0.1 to about 5 mole percent, based on the amount of the caprolactam, of 2-(2' -chloro-2', 3'-dehydrocyclohexamethyleneimino) -2, 3-dehydrocyclohexamethyleneimine having the following formula:

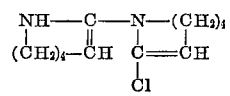

References Cited

UNITED STATES PATENTS

| | | | |
|---|---|---|---|
| 3,017,391 | 1/1962 | Mottus et al. | 260—78 |
| 3,138,576 | 6/1964 | Anderson et al. | 260—78 |
| 3,249,590 | 5/1966 | Pietrusza et al. | 260—78 |
| 3,250,750 | 5/1966 | Pietrusza et al. | 260—78 |
| 3,251,799 | 5/1966 | Pietrusza et al. | 260—78 |
| 3,345,340 | 10/1967 | Brouns | 260—78 |

HAROLD D. ANDERSON, Primary Examiner.

U.S. Cl. X.R.

260—2.5, 239, 857